(12) United States Patent
Yang (10) Patent No.: US 7,848,225 B2
(45) Date of Patent: Dec. 7, 2010

(54) SERVICE PROTECTING SWITCHING METHOD, SYSTEM AND DEVICE IN A CONNECTIONLESS NETWORK

(75) Inventor: Faming Yang, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 139 days.

(21) Appl. No.: 12/329,337

(22) Filed: Dec. 5, 2008

(65) Prior Publication Data

US 2009/0109843 A1    Apr. 30, 2009

Related U.S. Application Data

(63) Continuation of application No. PCT/CN2007/000928, filed on Mar. 22, 2007.

(30) Foreign Application Priority Data

Jun. 5, 2006    (CN)    ......................... 2006 1 0083530

(51) Int. Cl.
*H04J 1/16*    (2006.01)
(52) U.S. Cl. ..................................... 370/216
(58) Field of Classification Search ......... 370/216–220, 370/225, 227, 228, 241.1, 241, 242, 245, 370/244, 248
See application file for complete search history.

(56) References Cited

U.S. PATENT DOCUMENTS 6,324,161 B1 * 11/2001 Kirch ......................... 370/217

| | | | |
|---|---|---|---|
| 2003/0016624 A1 | 1/2003 | Bare | |
| 2005/0083952 A1* | 4/2005 | Swain | 370/401 |
| 2007/0253326 A1* | 11/2007 | Saha et al. | 370/217 |
| 2008/0291822 A1* | 11/2008 | Farkas et al. | 370/216 |

FOREIGN PATENT DOCUMENTS

| | | |
|---|---|---|
| CN | 1710869 A | 12/2005 |
| CN | 1719825 A | 1/2006 |
| CN | 1764144 A | 4/2006 |

* cited by examiner

*Primary Examiner*—Kwang B Yao
*Assistant Examiner*—Juvena Loo
(74) *Attorney, Agent, or Firm*—Leydig, Voit & Mayer, Ltd.

(57) ABSTRACT

A method for service protection switching in a connectionless network is provided. The method includes detecting if there is any failure which may have occurred on the respective path in the working flow domain and protection flow domain, coupled between the protection switching point and each of the at least two remote protection switching points. If any failure occurs on a path in one of the working flow domain and the protection flow domain, the service delivered via the failure-occurred path is switched to a path in the other flow domain for further delivery, where the path in the other flow domain is coupled to the remote protection switching point which is located on the failure-occurred path. A system and a device for service protection switching in a connectionless network are further provided such that the protection switching can be done on a path-by-path basis. Accordingly, the flooding problem caused by the protection switching is avoided effectively.

5 Claims, 3 Drawing Sheets

SERVICE PROTECTING SWITCHING METHOD, SYSTEM AND DEVICE IN A CONNECTIONLESS NETWORK

CROSS-REFERENCE TO RELATED APPLICATIONS

This application is a continuation of International Patent Application No. PCT/CN2007/000928, filed Mar. 22, 2007, which claims priority to Chinese Patent Application No. 200610083530.2, filed Jun. 5, 2006, both of which are hereby incorporated by reference in their entirety.

FIELD OF THE INVENTION

The present invention relates to network protection, and, more specifically, to a method, system, and device for connectionless service protection.

BACKGROUND

A connectionless network with protection switching support is comprised of an Ethernet switch located at core, also referred to as a core device, and an Ethernet switch or router located at edge, also referred to as an edge device or an edge node. The edge device is responsible for performing service switching operation when a failure occurs in the network with protection switching support. The edge device is coupled directly to an external device of the network with protection switching support. In the network with protection switching support, data are forwarded in a connectionless way. For instance, in an Ethernet, data packets are forwarded via a data path forwarding table established, based on a spanning tree environment. The network which forwards data packets in a connectionless way is constituted by interconnected Ethernet switch devices. The network is also referred to as a flow domain.

In the past, a protection switching solution for Point-to-Point (P2P) virtual local area network (VLAN) service was proposed. Also, protection switching methods for Point-to-MultiPoint (P2MP) VLAN and Multipoint-to-Multipoint (MP2MP) VLAN are under study.

Figure 1:
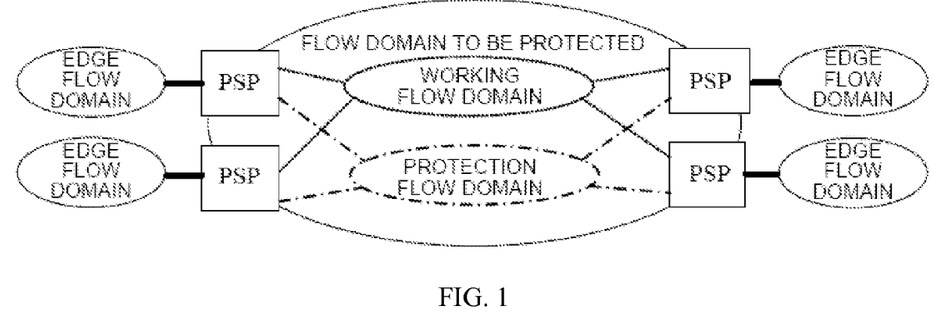
FIG. 1 is an illustration of flow domain protection switching in a connectionless network.

Service protection switching methods for a connectionless network according to conventional approaches are described. Since there is no connection-oriented connection path in the flow domain, the whole flow domain is suggested to be protected. The flow domain protection to be protected is divided into a working flow domain, a protection flow domain, and several protection switching points (PSP) coupled to other flow domains. FIG. 1 illustrates a diagram of flow domain protection for a connectionless network. When the working flow domain or protection flow domain fails, PSP is responsible for switching service flow. For instance, suppose there is no failure occurs in the protection flow domain, when a failure occurs in the working flow domain, the protection switching method would be that the PSP switches the original service delivered from working flow domain to protection flow domain.

However, the foregoing method is confronted with the below problems.

On one hand, every switching point has to coordinate with the rest of the switching points so as to switch the service flow delivered from the working flow domain to the protection flow domain. Therefore, the coordination among the PSPs is very complex. On the other hand, since there is no forward entry corresponding to the data flow switched from the working flow domain in the protection flow domain, the service data packets will be flooded after the protection switching. Therefore, the protection switching mechanism for the foregoing flow domain seems complicated and further study is desired.

Currently, there are two protection switching solutions for flow domain protection.

The first solution is a VLAN service protection switching solution.

This protection switching solution is applicable to a central backbone Ethernet, with a working B-VLAN tree and a protection B-VLAN tree established for the working backbone VLAN ID (B-VLAN ID) and the protection B-VLAN ID, respectively. In normal conditions, the B-VLAN tree may be utilized and the corresponding service data packets from outside the central backbone network are transmitted according to the known data path forwarding table. Meanwhile, a continuity check (CC) message for continuity failure management (CFM) is transmitted periodically to check the working status (NORMAL or FAILURE) of the working B-VLAN tree and the protection B-VLAN, respectively, so that the protection switching for the service data can be performed when a failure occurs. Suppose the protection B-VLAN tree is in a normal state. When a failure occurs on the working B-VLAN tree, all the service data packets delivered originally by the working B-VLAN tree are now switched to the protection B_VLAN tree for further delivery.

The VLAN service protection switching solution proposed by the foregoing solution may not be able to avoid flooding of the unicast data stream in the switched flow domain, wherein the unicast data stream was forwarded according to the known data path forwarding table prior to the switching. Moreover, when a failure occurs on the working B-VLAN tree, data packets on the B-VLAN tree, which are not subject to the failure, would also be switched to the protection B-VLAN tree. The switching according to this solution is implemented on a tree-by-tree basis, which means that as long as there is any failure occurred on the working B-VLAN tree, all of the data packets on the whole tree would go through the protection switching. Consequently, this could cause the service data packets out of sequence.

The second solution is a protection switching method, based on a spanning tree environment.

This method may be implemented as follows. In a network with a protection switching support comprised of Ethernet switches and routers, edge devices, such as Ethernet switches or routers, are responsible for protection switching. Different VLAN IDs are used in the network with protection switching support to represent different spanning trees. In addition, for each node, a tree excluding that node is configured, and for each link, a tree excluding that link is configured. As such, at least one integral tree is guaranteed when a single node or a single link fails. The topology of the configured tree remains unchanged, even when a failure occurs.

In the network with protection switching support, a master backup mode or a share mode is used to deliver service. In the master backup mode, a master tree and a protection tree are predefined. Normally, all of the services are delivered along the master tree, according to the known data path forwarding table. When a node or a link on the master tree fails, all of the services over the master tree are switched to one of the protection trees in the network with protection switching support, which is not subject to the failure. In the share mode, normally, services are evenly distributed to all the working trees for delivery. When a node or a link on some tree fails, all of the services delivered along the failure-affected working tree would be switched to the rest of the trees with failures.

In order to ensure a fast protection switching when a single link or single node fails, three types of messages are utilized to check the performance of each tree in the protection switching method based on the spanning tree environment, according to the second solution.

(1) Keep Alive (KA) message. A KA message of each VLAN ID is broadcasted periodically by one or more edge nodes to the rest edge nodes.

(2) Failure notification message. If the KA message of a certain VLAN ID has not been received by a certain edge node in an amount of time of detection, the edge node would inform all the other edge nodes, by a failure notification message, that the tree to which the VLAN ID corresponds is faulty.

(3) Failure repaired notification message. When a certain edge node receives a corresponding KA message from the original failure-occurred tree, the edge node informs all the other edge nodes, by a failure repaired notification message, that the tree to which the VLAN ID corresponds has been repaired to normal.

The second solution is based on tree-by-tree switching as well. According to the second solution, when switching the service data packets, the flooding of unicast data stream in the switched flow domain may not be avoided, wherein the unicast data stream was forwarded, according to the known data path forwarding table prior to the switching. When the master tree or working tree fails, the data packets on the master tree or working tree, which are not subjected to the failure, would also be switched to the other protection tree. Accordingly, this could cause the service data packets to become out of sequence.

SUMMARY

Embodiments of the present invention provide a method, system, and device for connectionless service protection switching in connectionless network, which can implement the protection switching for point-to-multipoint or multipoint-to-multipoint services by way of point-to-point protection switching. The method system and device can effectively avoid the flooding problem caused by the protection switching.

Specifically, the technical solutions according to the embodiments of the present invention are presented as follows.

A method for service protection switching in a connectionless network may be applicable among a plurality of protection switching points that belong to a same service instance. The plurality of protection switching points are located in a network with protection switching support, including a working flow domain and a protection flow domain. Each protection switching point couples to at least two remote protection switching points. A path exists between the protection switching point and each remote protection switching point, in the working flow domain and protection flow domain, respectively. The method includes below steps.

Each protection switching point detects if any failure occurred on each path in the working flow domain and protection flow domain, coupled between the protection switching point and each of the at least two remote protection switching points. If any failure occurs on a path in one of the working flow domain and the protection flow domain, the service delivered via the failure-occurred path is switched to a path in the other flow domain for further delivery, wherein the path in the other flow domain is coupled to the remote protection switching point, which is located on the failure-occurred path.

A system for service protection switching in a connectionless network includes a working flow domain, protection flow domain, and a plurality of protection switching points belonging to a same service instance.

The plurality of protection switching points is located in a network with protection switching support, including the working flow domain and the protection flow domain. Each protection switching point couples to at least two remote protection switching points. In addition, there is a path between the protection switching point and each remote protection switching point, in the working flow domain and protection flow domain, respectively.

Each protection switching point detects if any failure occurs on each path coupled between the protection switching points and at least two remote protection switching points in the working flow domain and protection flow domain, respectively. If any failure occurs on a path in one of the working flow domain and the protection flow domain, the service which was delivered via failure-occurred path previously is now switched to a path in the other flow domain for further delivery, wherein the path in the other flow domain is coupled to the remote protection switching point, which is located on the failure-occurred path.

A protection switching device is also provided. The device belongs to a same service instance along with at least two protection switching devices. Each protection switching device is located in a network with protection switching support, including the working flow domain and the protection flow domain. Each protection switching device couples to at least two remote protection switching devices. In addition, there is a path between the protection switching device and each remote protection switching device, in the working flow domain and protection flow domain, respectively. The device includes the below elements.

A first module detects if there is any failure occurs on each path coupled between the device and at least two remote protection switching devices in the working flow domain and protection flow domain, respectively.

The device further includes a second module. If any failure occurs on a path in one of the working flow domain and the protection flow domain, the service delivered via the failure-occurred path is switched to a path in the other flow domain for further delivery, wherein the path in the other flow domain is coupled to the remote protection switching device, which is located on the failure-occurred path.

It can be seen that the service protection switching method, system and device for connectionless network, according to the present invention, is based on point-to-point path switching, rather than tree switching. When a failure occurs in the network with the protection switching support, only the service delivered between the failure-affected protection switching points is switched while other services between the protection switching points which are not affected by the failure will not be switched. The embodiments of the present invention effectively avoid the flooding problem caused by the protection switching, thereby alleviating the influence on the MP2MP service imposed by the failure occurred in the network with protection switching support.

DETAILED DESCRIPTION

According to embodiments of the present invention, when a failure occurs in a network with protection switching support, only the service delivered between the failure-affected protection switching points is switched, while the service between the protection switching points which are not affected by the failure will not be switched.

Specifically, a connectionless network with protection switching support includes a working flow domain, a protection flow domain, and a plurality of protection switching points. The method according to the embodiments of the present invention may be applicable among a plurality of protection switching points that belong to a same service instance. Each protection switching point is coupled to at least two remote protection switching points. A path exists between the protection switching point and each remote protection switching point, in both the working flow domain and the protection flow domain, respectively. Each protection switching point, information of the connectionless network with protection switching support is configured and a working port and a protection port of each protection switching point is determined. The working port is coupled to at least one path in the working flow domain of the network with protection switching support. The protection port is coupled to at least one path in the protection flow domain of the network with protection switching support. In a normal situation, the protection switching point sends/receives data packets, or service traffic, via its working port, through a working flow domain. Meanwhile, each protection switching point periodically broadcasts a failure detection message, such as a Keep Alive message, via its working port and protection port through the working flow domain and the protection flow domain, respectively, to the working port and the protection port of the rest of the protection switching points, it couples in the network with protection switching support, and checks the status of local working/protection path, and the status of remote working/protection path. In a predetermined detection time, if the working port of a certain protection switching point does not receive the failure detection message, the protection switching point determines that a failure occurs on the point-to-point working path between the remote protection switching point, which transmits the failure detection message and the protection switching point itself. Then, the protection switching point sends a failure notification message via its own protection port to the protection port of the remote protection switching point connecting the failure-occurred working path. The remote protection switching point which receives the failure notification message switches the data packets delivered via the failure-occurred path to the protection flow domain, and transmits the data packets via its own protection port through the protection flow domain, according to the address information in the failure notification message. In the embodiments of the present invention, the remote protection switching point refers to another protection switching point, which couples to the protection switching point via a path. In other words, the protection switching point and its remote protection switching point are two protection switching devices which are remote protection switching points for each other and are coupled to a path in the working flow domain and also coupled to a path in the protection flow domain. The remote protection switching point may also be referred to as a remote protection switching point.

Embodiments of the present invention further include the followings. In a predetermined detection time, if the foregoing working port of the protection switching point which determines the occurrence of a failure on a path receives, once again, a failure detection message via the failure-occurred path, the protection switching point determines that the path is back to normal. Also, the protection switching point sends a failure repaired notification message via its working port to the working port of the remote protection switching point to which the path couples. The protection switching point which receives the failure repaired notification message may switch the data packets sent through the protection flow domain via its protection port to the working flow domain, and transmit the data packets via its working port.

According to the embodiments of the present invention, if the protection port of a certain protection switching point has not received the failure detection message in a predetermined detection time, its processing procedure are similar to the foregoing method, which is herein omitted for brevity.

The purpose, technical solutions and advantages concerning the embodiments of the present invention will become more readily appreciated by reference to the following description of the embodiments, when taken in conjunction with the accompanying drawings.

Figure 2:
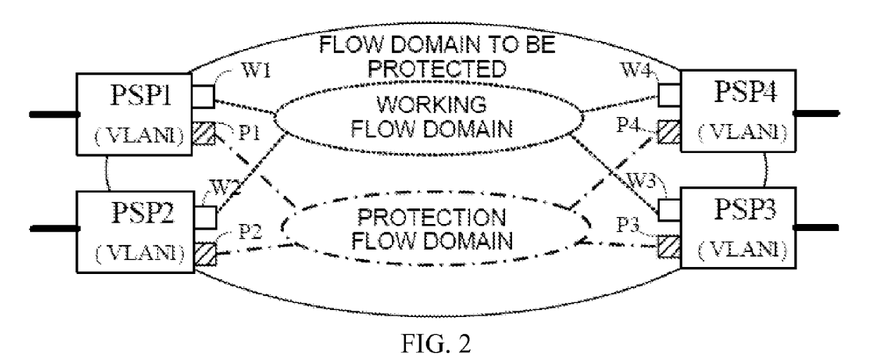
FIG. 2 is an illustration of configuration for connectionless network with protection switching support, according to an embodiment of the present invention.

FIG. 2 is an illustration of configuration for connectionless network with protection switching support, according to an embodiment of the present invention. In the network with protection switching support, a VLAN access group is comprised of a group of VLAN access points with the same VLAN ID. Each VLAN access point, or the protection switching point, is a member in the VLAN access group. As illustrated in FIG. 2, the whole flow domain to be protected provides a corresponding VLAN service delivery service for a VLAN access group. Suppose the VLAN ID is VLAN1, the PSP1~PSP4 are four edge devices, or four VLAN access points in the VLAN access group, and each VLAN access point has two ports: working port W and protection port P. Internal links between working ports W, as shown in dashed line, interacts with one another in the working flow domain. Internal links between each protection port P, as shown in dot-dash line, interacts with one another in the protection flow domain. The working flow domain and the protection flow domain have their nodes and are link separated. When the working flow domain or the protection flow domain forwards the data based on the spanning tree environment, the topology of the spanning tree does not vary with the failure. The information of the network with protection switching support as illustrated in the configuration diagram of FIG. 2 includes the following.

(1) Configuring local information for each VLAN access point in the VLAN access group. The local information includes a working port ID, a protection port ID, Media Access Control (MAC) address of the VLAN access point, and multicast address of the VLAN access group.

(2) Configuring remote information for each VLAN access point in the VLAN access group. The remote information includes the MAC addresses of the other VLAN access points in the same VLAN access group.

Table 1 to Table 4 respectively illustrate the configuration of PSP1~PSP4 in VLAN 1, as shown below. For the sake of brevity, the multicast address of the VLAN access group is omitted.

TABLE 1

| Local Working Port | Local Protection Port | Local VLAN Access MAC Address | Remote VLAN Access MAC Address |
|---|---|---|---|
| W1 | P1 | MAC1 | MAC2, MAC3, MAC4 |

TABLE 2

| Local Working Port | Local Protection Port | Local VLAN Access MAC Address | Remote VLAN Access MAC Address |
|---|---|---|---|
| W2 | P2 | MAC2 | MAC1, MAC3, MAC4 |

TABLE 3

| Local Working Port | Local Protection Port | Local VLAN Access MAC Address | Remote VLAN Access MAC Address |
|---|---|---|---|
| W3 | P3 | MAC3 | MAC1, MAC2, MAC4 |

TABLE 4

| Local Working Port | Local Protection Port | Local VLAN Access MAC Address | Remote VLAN Access MAC Address |
|---|---|---|---|
| W4 | P4 | MAC4 | MAC1, MAC2, MAC3 |

Each VLAN access point has been assigned a respective ID, also referred to as a Maintenance Entity Point ID (MEP ID). According to the IEEE regarding the OAM standard, the MEP ID is contained in the OAM message to identify the maintenance entity point. Then, configuring the information of network with protection switching support, according to an embodiment of the present invention, may further includes configuring a local MEP ID, or MEP ID, of the VLAN access point, for each VLAN access point and remote MEP ID information, or MEP IDs for other VLAN access points in the same VLAN access group.

After a network with protection switching support is configured, the VLAN access group may start to work. In a normal condition, the VLAN access point sends/receives data packets through the working flow domain via its working port. Meanwhile, each VLAN access point in the VLAN access group periodically performs a failure detection procedure. The implementation of the failure detection procedure is detailed below.

The VLAN access point broadcasts the KA message via its working port and protection port periodically, e.g. at a regular time. The KA message includes the source address, destination address, and VLAN ID of the VLAN access group. The destination address is the multicast address of the VLAN access group and the source address is the VLAN access MAC address of the VLAN access point.

The VLAN access points check their local working paths and local protection paths, respectively, in the predetermined detection time. These paths are all point-to-point paths. For a certain VLAN access point, a local working path is a path along which a remote VLAN access point sends data through the working flow domain via a working port to the working port of this VLAN access point. A local protection path is a path along which a remote VLAN access point sends data though the protection flow domain via a protection port to the protection port of this VLAN access point.

The VLAN access points checks their remote working paths and remote protection paths, respectively. These paths are all point-to-point paths. For a certain VLAN access point, a remote working path is a path along which the VLAN access point sends data through the working flow domain via the working port to a remote VLAN access point and arrives at a working port of the remote VLAN access point. A remote protection path is a path along which the VLAN access point sends data through the protection flow domain via the protection port to a protection port of a remote VLAN access point, and arrives at a protection port of the remote VLAN access point. The VLAN access point obtains its remote working path status and remote protection path status, according to the local working path status or local protection path status of the remote VLAN access point.

Figure 3:
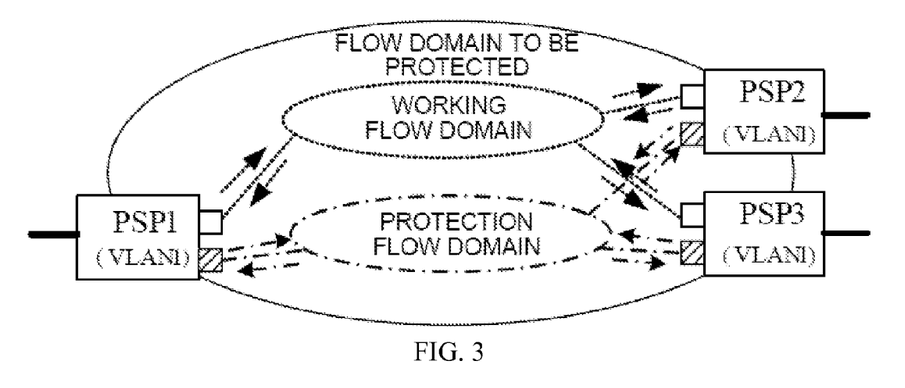
FIG. 3 is an illustration of monitoring path status for the network with protection switching support, according to an embodiment of the present invention.

FIG. 3 is an illustration of monitoring the path status for the network with protection switching support, according to an embodiment of the present invention. As illustrated in FIG. 3, each VLAN access point transmits a KA message via the working port and the protection port periodically. Meanwhile, each VLAN access point receives the KA message and determines if there is any failure occurred on the associated path, based on the fact of whether the KA message has been received in a predetermined detection time period. The KA message includes a source address, a destination address, and a VLAN ID. The source address is the VLAN access MAC address of the VLAN access point transmitting the KA message. The destination address is the multicast address of the VLAN access group, and the VLAN ID is the VLAN ID of the VLAN access group. Detailed implementation are described below.

The process of detecting the working path status is as follows.

1) When a VLAN access point has not received a KA message from a remote VLAN access point at its working/protection port within a predetermined detection time, it is determined that a local failure has been occurred on a corresponding local path. The working status of the path is thus logged as "FAILURE." The VLAN access point sends a working path failure notification message to the remote VLAN access point. The working path failure notification message includes a source address, a destination address, and a VLAN ID. The destination address is the VLAN access MAC address of the remote VLAN access point. The source address is the VLAN access MAC address of the VLAN access point.

2) When a VLAN access point receives a KA message from a certain remote VLAN access point at its working/protection port in a predetermined detection time, but the working status of the corresponding local path is "FAILURE," i.e. a failure is occurred once; then, the VLAN access point sends a working path failure repaired notification via the working port to the remote VLAN access point, and the working status of the path is logged as "NORMAL." The working path failure repaired notification includes a source address, a destination address, and a VLAN ID. The destination address is the access MAC address of the remote VLAN access point. The source address is the VLAN access MAC address of the VLAN access point.

3) When a VLAN access point receives a working path failure notification message or a working path failure repaired notification message, the VLAN access point determines the failure-occurred or failure-repaired remote path, according to the failure notification message or failure repaired notification message, and determines the status of the path as "FAILURE" or "NORMAL."

The process for detecting the status of the protection path is identical to the foregoing process for detecting the status of the working path, with the foregoing working path simply replaced by the protection path.

Figure 4:
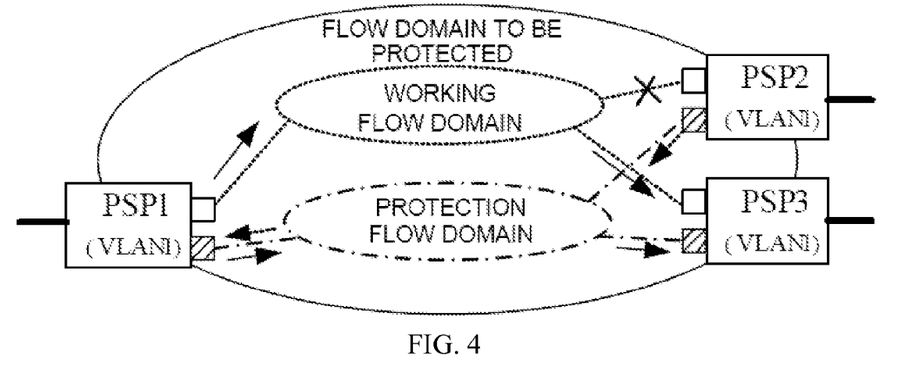
FIG. 4 is an illustration of monitoring path status for the network with protection switching support, according to an embodiment of the present invention.

FIG. 4 is an illustration of detecting the path failure status for the network with protection switching support, according to an embodiment of the present invention. An example is given to the failure detecting process with reference to FIG. 4. In FIG. 4, a unidirectional solid line is used to indicate the transmission direction of the KA message, which is transmitted periodically. A unidirectional dash line is used to indicate the transmission direction of the failure notification message. A cross "X" is used to indicate that the link is faulty.

As illustrated in FIG. 4, the VLAN 1 access point PSP1 sends a KA message periodically via its working port and protection port. At VLAN 1 access point PSP2, since the link is faulty, the PSP2 may not be able to receive the KA message from the remote PSP1 at its working port. Accordingly, it is determined that a failure has occurred on the working path between the PSP1 and the local end. Then, the PSP2 sends a failure notification message via its protection port to the protection port of the PSP 1. After receiving the failure notification message, the PSP1 may determine that a remote failure has occurred at the corresponding working path, according to the address information contained in the failure notification message.

Since the source address of the foregoing KA message includes a VLAN access MAC address, a data path forwarding table associated with the VLAN access MAC address may be established in the working flow domain and protection flow domain by self-learning. The implementation of self-learning is well-known by those skilled in the art. Hence, the implementation of self-learning is omitted herein for brevity. Instead of address learning, the data path forwarding table may also be established by a using control protocol. For instance, a Multiple Registration Protocol (MRP) may be used for registration of the VLAN access MAC address, and a data path forwarding table is predefined in the working flow domain and protection flow domain. That is, the data path forwarding table of VLAN access MAC address is established by propagating the registration message carrying VLAN access MAC address along the tree.

It should be noted that the VLAN access points according to the embodiments of the present invention are still in support of the existing failure detection method, such as failure aggregation, mismatch, etc.

In an embodiment of the present invention, different VLAN access groups may further be allowed to access different working flow domains and protection flow domains. For instance, the working flow domain and protection flow domain accessed by a VLAN access group are the protection flow domain and working flow domain accessed by another VLAN access group. Moreover, in an embodiment of the present invention, a protection switching point is allowed to function as multiple VLAN access points which belong to different VLAN access groups. In other words, location information and remote information of a plurality of different VLAN access groups may be configured at one protection switching point. According to the method, a respective VLAN access MAC address may be configured for the working port and the protection port at each VLAN access point.

The foregoing describes the implementation of configuring the network with protection switching support and failure detection approach with regard to the protection switching method, according to embodiments of the present invention. The purpose of the failure detection is to switch the data packets transmitted via the failure-occurred link to a normal link for continuity of transmission.

For instance where the protection switching point is the VLAN access point, the processing of data packets to be transmitted includes below three aspects.

1) MAC encapsulation

For data packets from outside the network with protection switching support, to encapsulate the external MAC header, the source address of the external MAC header is the VLAN access MAC address of the local VLAN access point transmitting the data packets, and the destination address is the VLAN access MAC address of the remote VLAN access point receiving the data packets.

The external MAC header may be determined according to a predetermined mapping rule of the MAC address. For instance, by learning the source address of the internal MAN header and the source address of the external MAC header of the data packet from the remote end, a mapping table storing the external MAC address and the internal MAC address can be obtained. For instance where a remote access MAC address A maps an internal MAC address B, if a data packet arrives at an edge node through the edge flow domain and if the destination address of the data packet is MAC address B, then the edge node may find out the remote node associated with the MAC address A to which the data packet needs to be transmitted by looking up the mapping table. The address of the external header encapsulated for the data packet is MAC address A. The implementation of encapsulation of the MAC header, self-learning of the MAC address mapping are well-know to those of ordinary skill, which is thereby omitted for brevity.

When the VLAN access MAC address of the remote VLAN access point can not be determined, the destination MAC address of the external MAC header is a broadcast address or a multicast address assigned to the VLAN access group.

2) VLAN TAG encapsulation

Two approaches may be used to determine if VLAN TAG encapsulation for the data packet is required. The first approach is to encapsulate an external VLAN TAG for the data packet, according to the predetermined configuration information which includes access VLAN ID. The VLAN TAG includes the VLAN ID information. The second approach is that if the original external VLAN TAG in the data packet already has included corresponding access VLAN ID information, encapsulation will not be performed on the data packet.

3) Data packet transmission (1) For the data packet which has been encapsulated with the VLAN ID information, if the destination address of the MAC header is a broadcast address or a multicast address, the processing of broadcast or multicast data packet is accomplished as follows.

If none of the remote working paths associated with the VLAN access group identified by the VLAN ID has encountered a remote failure, the data packet is transmitted via the working port. If at least one remote working path associated with the VLAN access group identified by the VLAN ID has encountered a remote failure, and none of the remote protection paths associated with the VLAN access group has encountered a remote failure, the data packet is transmitted via the protection port. If at least one remote path in the working flow domain has encountered a remote failure, and at least one protection path in the protection flow domain has encountered a failure, the data packet may be dropped out or the data packet may be transmitted via the working port or the protection port.

(2) For the data packet which has been encapsulated with the VLAN ID has been encapsulated, if the destination address of the MAC header is a unicast address, the unicast address is the VLAN access MAC address of a remote VLAN access point in the VLAN access group. The processing of unicast data packet is accomplished as follows.

A remote working path and a remote protection path starting from the local end are determined, according to the VLAN access MAC address of the remote VLAN access point. If the remote working path has no remote failure, the data packet is transmitted via the working port. If the remote working path has a remote failure, but the remote protection path has no remote failure, the data packet is transmitted via the protection port. If both the remote working path and the remote protection path have failures, the data packet is dropped out.

It should be noted that for each protection switching point, a mapping relationship between the destination MAC address of the data packet and the destination VLAN access MAC address (i.e. the VLAN access MAC address of the remote VLAN accessing point) may be pre-configured before the data packet is received from outside the network with protection switching support. In this case, the processing of the data packet only includes the foregoing process 2) and (1) of the foregoing process 3). The (2) of the foregoing process 3) is presented as follows.

The MAC address of the remote protection switching point can be obtained by looking up the pre-configured mapping relationship. Then, the corresponding remote working path and remote protection path can be determined based on the MAC address of the remote protection switching point. If the remote working path has no remote failure, the data packet is transmitted via the working port. If the remote working path has a remote failure, but the protection path has no remote failure, the data packet is transmitted via the protection port. If both the remote working path and the remote protection path have failures, the data packet is dropped out. In addition, it should be noted that, in order to avoid the flooding problem caused by the protection switching, a control protocol, such as MRP, may be used for registration of the destination MAC address of the service data, so as to predefine a path forwarding table in the working flow domain and protection flow domain.

Taking a VLAN access group as an example, the process of transmitting the data packets in normal and failure-occurred situation in the connectionless network with protection switching support is described below by reference to the description of the embodiments.

Figure 5A:
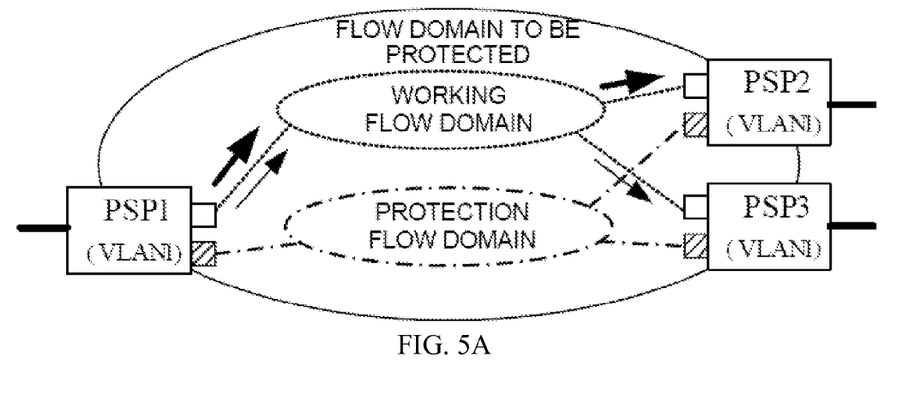
FIG. 5a is an illustration of delivering unicast data packets when the network with protection switching support is in normal condition, according to an embodiment of the present invention.

FIG. 5a is an illustration of transmitting unicast data packets when the network with protection switching support is in normal condition, according to an embodiment of the present invention. As illustrated in FIG. 5a, the transmission path of the unicast data packet transmitted from the VLAN1 access point PSP1 to the VLAN1 access point PSP2 is indicated by a bold solid single arrow. The transmission path of the unicast data packet transmitted from the VLAN1 access point PSP1 to the VLAN1 access point PSP3 is indicated by the solid single arrow. The data is both transmitted along the foregoing paths via working port and through the working flow domain.

Figure 5B:
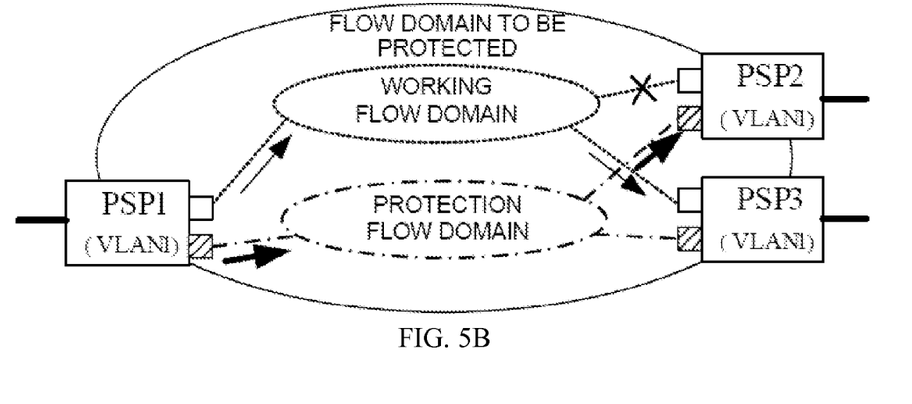
FIG. 5b is an illustration of delivering unicast data packets when the network with protection switching support is faulty, according to an embodiment of the present invention.

FIG. 5b is an illustration of transmitting unicast data packets in the case where the network with protection switching support is faulty, according to an embodiment of the present invention. As illustrated in FIG. 5b, suppose the link where X appears is detected to be faulty. After PSP1 is informed of the failure notification, the PSP1 will switch the unicast data packets, transmitted from the PSP1 itself to the VLAN1 access point PSP2, to a path in the protection flow domain, where the data packets are transmitted from the protection port of PSP1 to the protection port of PSP2, as illustrated by bold solid arrow in FIG. 5b. The data packets transmitted from the PSP1 to the PSP3 still follow the original path and are transmitted through the working flow domain, as illustrated by the solid single arrow in FIG. 5b.

Figure 6A:
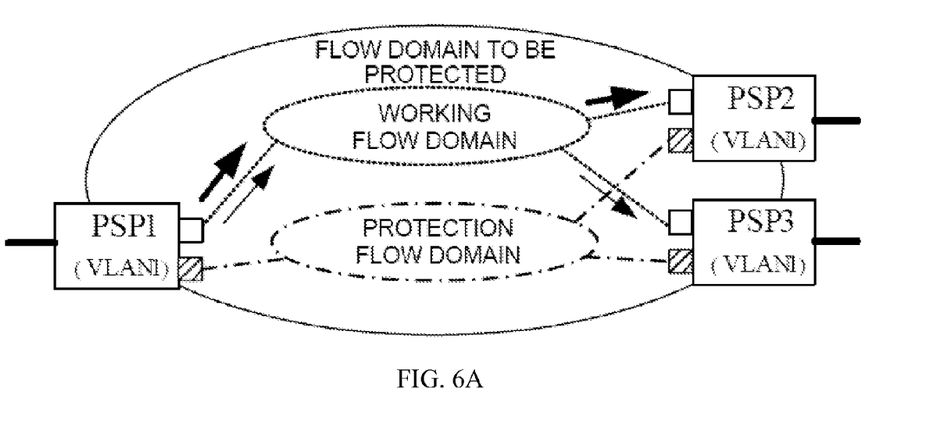
FIG. 6a is an illustration of delivering broadcast data packets when the network with protection switching support is in normal condition, according to an embodiment of the present invention.

FIG. 6a is an illustration of transmitting broadcast data packets when the network with protection switching support is in normal condition, according to an embodiment of the present invention. The working path is identical to that of FIG. 5a, which is omitted herein for brevity.

Figure 6B:
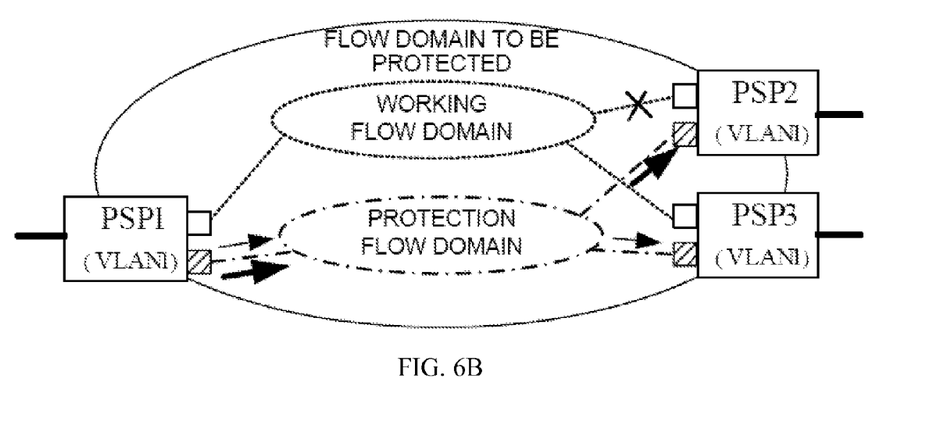
FIG. 6b is an illustration of delivering broadcast data packets when the network with protection switching support is faulty, according to an embodiment of the present invention.

FIG. 6b is an illustration of transmitting broadcast data packets in the case where the network with protection switching support is faulty, according to an embodiment of the present invention. As illustrated in FIG. 6b, suppose the link where X appears is detected to be faulty. After PSP1 is informed of the failure notification, the PSP1 will switch the broadcast data packets, transmitted from the PSP1 to the VLAN1 access point PSP2, to a path in the protection flow domain where the data packets are transmitted from the protection port of PSP1 to the protection port of PSP2, as illustrated by bold solid single arrow in FIG. 6b. Meanwhile, the PSP1 switch the broadcast data packets, transmitted from the PSP1 to the VLAN access point PSP3, to a path in the protection flow domain where the data packets are transmitted from the protection port of the PSP1 to the protection port of the PSP3, as illustrated by solid singal arrow.

As can be seen from the foregoing embodiments, for data packets transmitted in the same VLAN access group, when a failure occurs, in most cases, only a small fraction of the data stream are affected by the failure. The protection switching method according to the present invention only switches the services concerning the failure-affected VLAN access points. The services concerning the VLAN access points which have not been affected by the failure will not be switched. Therefore, the MP2MP service is less impaired by the failure.

The embodiments of the present invention further provide a system for protection switching in a connectionless network. The system includes a working flow domain, a protection flow domain, and a plurality of protection switching points belonging to a same service instance.

The plurality of protection switching points are located in a network with protection switching support, including the working flow domain and the protection flow domain. Each protection switching point couples to at least two remote protection switching points. In addition, there is a path between the protection switching point and each remote protection switching point in the working flow domain and protection flow domain, respectively.

According the embodiments of the present invention, each protection switching point broadcasts a failure detection message to at least two remote protection switching points to which it couples. Each protection switching point detects the path connected between the protection switching point and each remote protection switching point in the working flow domain and protection flow domain, respectively, to see if any failure has occurred. If the protection switching point has not received a failure detection message broadcast from the remote protection switching point via a path in the working flow domain in a predetermined detection time, the protection switching point determines that a failure occurs on the path in the working flow domain, and sends a failure notification message to the remote protection switching point on the failure-occurred path via a path in the protection flow domain. If the protection switching point has not received a failure detection message broadcast from the remote protection switching point via a path in the protection flow domain in a predetermined detection time, the protection switching point determines that a failure occurs along the path in the protection flow domain, and sends a failure notification message to the remote protection switching point on the failure-occurred path via a path in the working flow domain. After the remote protection switching point receives the failure notification message via the path in the working flow domain, it switches the service in the service instance, which is being transmitted along the failure-occurred path and whose destination address is the source address of the failure notification message, to a path in the working flow domain for further delivery. After the remote protection switching point receives the failure notification message transmitted via the path in the protection flow domain, the service which was previously delivered via the failure-occurred path is now delivered via the path in the protection flow domain.

According to the present embodiment, a path forwarding table is stored in the protection switching point in advance. The switched service will be forwarded according to the path forwarding table.

If the protection switching point receives a failure detection message from the remote protection switching point from the path where a failure was previously detected, the path where a failure was previously detected is regarded as to be repaired. Also, a failure repaired notification message is transmitted to the remote protection switching point via the path where the failure was previously detected. The remote protection switching point determines the failure-repaired path, according to the source address information in the failure repaired notification message, and delivers the switched service via the failure-repaired path.

The embodiments of the present invention further provides a protection switching device, which belongs to a same service instance along with at least two protection switching devices. Each protection switching device is located in a network with protection switching support, including the working flow domain and the protection flow domain. Each protection switching point couples to at least two remote protection switching devices. A path exists between the protection switching device and each remote protection switching device, in the working flow domain and protection flow domain, respectively. The device includes a first module configured to broadcast periodically a failure detection message via paths in working flow domain and a protection flow domain to at least two remote protection switching devices coupling to the paths. If a failure detection message has not been received from a path in the working flow domain in a predetermined detection time, it is determined that a failure occurs on the path in the working flow domain. If a failure detection message has not been received from a path in the protection flow domain in a predetermined detection time, it is determined that a failure occurs on the path in the protection flow domain. The device further includes a second module. If the first module determines that a failure occurs on the path in the working flow domain, the second module sends a failure notification message via a path in the protection flow domain and delivers the service via a path in the protection flow domain, wherein the path in the protection flow domain is coupled to the remote protection switching device, which is located on the failure-occurred path. If the first module determines that a failure occurs on the path in the protection flow domain, the second module sends a failure notification message via a path in the working flow domain and delivers the service along a path in the working flow domain, wherein the path in the working flow domain is coupled to the remote protection switching device, which locates along the failure-occurred path.

According to the present embodiment, the protection switching device further includes a third module. After receiving the failure notification message of the remote protection switching device via the path in the working flow domain, the third module delivers the service, which was previously delivered via the failure-occurred path, via the path in the working flow domain. After receiving the failure notification message of the remote protection switching device via the path in the protection flow domain, the third module delivers the service, which was previously delivered via the failure-occurred path, via the path in the protection flow domain.

Moreover, if the protection switching device receives a failure detection message from the path where a failure was previously detected, the failure-occurred path is regarded as repaired. The failure repaired notification message is transmitted via the path where the failure was previously detected. After the third module of the remote protection switching device receives the failure repaired notification message, the third module determines the failure-repaired path, according to the source address in the failure repaired notification message, and delivers the switched service via the failure-repaired path.

The foregoing is merely preferred embodiments of the present invention, which shall not be construed as limitation to the scope of protection of the present invention. Any modification, equivalent, improvement, etc., made within the spirit and principle of the present invention shall fall with in the scope of protection of the present invention.

What is claimed is:

1. A method for service protection switching in a connectionless network, applicable among a plurality of protection switching points that belong to a same service instance, wherein the plurality of protection switching points are located in a network with protection switching support including flow domains comprising at least working and protection flow domains, and each protection switching point is coupled to at least two remote protection switching points, and a path exists between the protection switching point and each of its remote protection switching points in the flow domains, and wherein the method comprises:

establishing in the flow domains a path forwarding table for all of the protection switching points;

broadcasting, by each protection switching point a failure detection message periodically to at least two remote protection switching points to which each protection switching point is coupled;

determining, by each protection switching point, that a failure has occurred on a path in the flow domains if the protection switching point has not received the failure detection message, broadcasted by the remote protection switching point, from the path in the flow domains within a predetermined detection time;

sending a failure notification message, via the path in the other flow domain, to the remote protection switching point which is located on the failure-occurred path when each protection switching point detects a failure occurred on a path in one of the flow domains; and, delivering a service in the service instance, whose destination address is the source address of the failure notification message, via the path in the other flow domain according to the path forwarding table after receiving the failure notification message from the remote protection switching point.

2. The method of claim 1, wherein the protection switching point is a virtual local area network (VLAN) access point; and establishing the path forwarding table comprises:

establishing the path forwarding table by self-learning according to the destination media access controller (MAC) address contained in the failure detection message; or utilizing multiple registration protocol (MRP) to establish the VLAN path forwarding table by registrating unicast address.

3. The method of claim 1, wherein the protection switching point is a virtual local area network (VLAN) access point, and the method further comprises:

configuring information of the network with protection switching support on the VLAN access point, wherein the information of the network with protection switching support comprises:

local information of the VLAN access point, the local information comprising a MAC address of the local VLAN access point, a multicast address of a VLAN access group comprising the local VLAN access point and at least one VLAN access point having the same VLAN ID with the local VLAN access point; and the VLAN ID of the VLAN access group;

remote information of the VLAN access point, comprising a MAC address of at least one VLAN access point in the VLAN access group excluding the local VLAN access point;

wherein the failure detection message comprises the VLAN ID, destination address and source address of the VLAN access group, wherein the destination address is the multicast address of the VLAN access group and the source address is the MAC address of the local VLAN access point;

wherein broadcasting the detection message comprises broadcasting the failure detection message according to the VLAN ID, destination address and source address of the VLAN access group included in the failure detection message.

4. The method of claim 1, wherein the protection switching point is a virtual local area network (VLAN) access point, and the method further comprises:

configuring information of the network with protection switching support on the VLAN access point, wherein the information of the network with protection switching support comprises:

local information of the VLAN access point, the local information comprising a MAC address of the local VLAN access point, a multicast address of a VLAN access group comprising the local VLAN access point and at least one VLAN access point having the same VLAN ID with the local VLAN access point; and the VLAN ID of the VLAN access group; and remote information of the VLAN access point, comprising a MAC address of at least one VLAN access point in the VLAN access group excluding the local VLAN access point;

the failure notification message comprising the VLAN ID, destination address and source address of the VLAN access group, wherein the destination address is a MAC address of the remote VLAN access point on the failure-occurred path, and the source address is the MAC address of the local VLAN access point;

determining the failure-occurred path according to the source address information in the failure notification message when the VLAN access point receives the failure notification message from the remote VLAN access point.

5. The method of claim 1, wherein the protection switching point is a virtual local area network (VLAN) access point, and the method further comprises:

configuring information of the network with protection switching support on the VLAN access point, wherein the information of the network with protection switching support comprises:

local information of the VLAN access point, comprising a MAC address of the local VLAN access point, a multicast address of a VLAN access group comprising the local VLAN access point and at least one VLAN access point having the same VLAN ID with the local VLAN access point; and the VLAN ID of the VLAN access group; remote information of the VLAN access point, comprising: a MAC address of at least one VLAN access point in the VLAN access group, with the local VLAN access point excluded, sending, by each VLAN access point, a failure repaired notification message to the remote VLAN access point via the path where a failure was previously detected if a VLAN access point receives the failure detection message from the remote VLAN access point via the path where a failure was previously detected, wherein the failure repaired notification message comprises the VLAN ID, destination address and source address of the VLAN access group, the destination address being a MAC address of the remote VLAN access point on the path where a failure was previously detected, and the source address being the MAC address of the local VLAN access point, determining, by each VLAN access point, the failure-repaired path according to the source address in the failure repaired notification message after an VLAN access point receives the failure repaired notification message from the path where a failure was previously detected; and delivering the service, which was delivered via the path in the other one of the working flow domain and the protection flow domain, via the failure-repaired path.

* * * * *